United States Patent [19]

Vostovich

[11] 4,069,190

[45] Jan. 17, 1978

[54] HEAT RESISTANT ETHYLENE-PROPYLENE RUBBER AND INSULATED CONDUCTOR PRODUCT THEREOF

[75] Inventor: Joseph Edward Vostovich, Bridgeport, Conn.

[73] Assignee: General Electric Company, New York, N.Y.

[21] Appl. No.: 576,555

[22] Filed: May 12, 1975

[51] Int. Cl.² .......................... C08K 3/04; C08K 3/34
[52] U.S. Cl. ...................... 260/31.8 M; 174/110 AR; 260/31.8 PQ; 260/33.6 AQ; 260/33.6 PQ; 260/42.15; 260/42.33; 260/42.41; 260/42.45; 260/897 C; 428/390
[58] Field of Search ............. 260/42.41, 42.33, 897 C, 260/31.8 M, 31.8 PQ, 33.6 AQ, 33.6 PQ

[56] References Cited

U.S. PATENT DOCUMENTS

| | | | |
|---|---|---|---|
| 3,278,480 | 10/1966 | Radcliff et al. | 260/897 C |
| 3,553,348 | 1/1971 | Betts | 260/42.41 |
| 3,580,867 | 5/1971 | Spenadel | 260/897 C |
| 3,725,330 | 3/1973 | Shirato et al. | 260/42.33 |
| 3,751,378 | 8/1973 | Cowperthwaite et al. | 260/42.33 |

OTHER PUBLICATIONS

Nordel, No. 6, E. I. Du Pont de Nemours and Co., Wilmington, Del., 1967.
Smith et al, EPR for Wire and Cable Insulation, in Rubber World, Mar. 1964, pp. 54–65.

Primary Examiner—James H. Derrington
Attorney, Agent, or Firm—R. G. Simkins; P. L. Schlamp; F. L. Neuhauser

[57] ABSTRACT

A crosslink curable ethylene-propylene rubber composition with improved resistance to heat, the cured rubber composition and electrical conductors insulated with said cured rubber composition. The improved rubber composition comprises a combination of ethylene-propylene rubber, chlorosulfonated polyethylene, zinc oxide, talc and carbon black in particular proportions.

8 Claims, 1 Drawing Figure

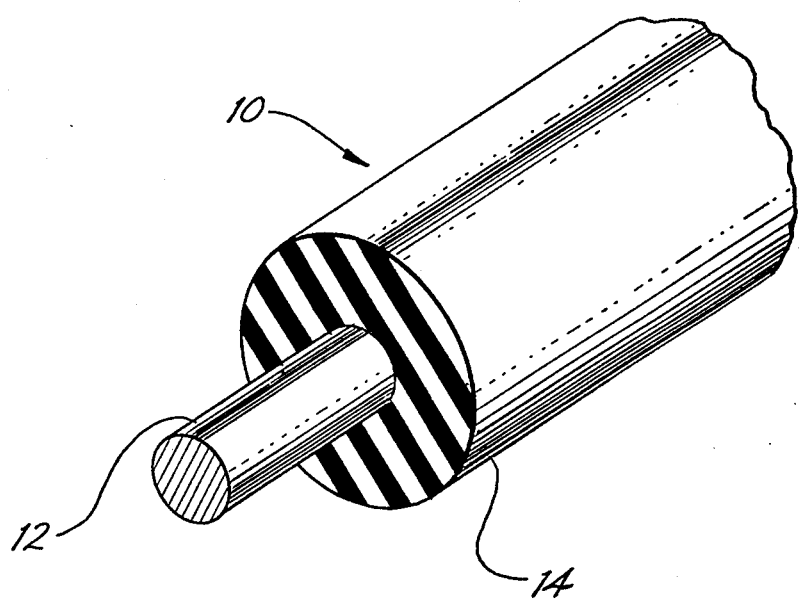

HEAT RESISTANT ETHYLENE-PROPYLENE RUBBER AND INSULATED CONDUCTOR PRODUCT THEREOF

BACKGROUND OF THE INVENTION

Loss of elasticity, or embrittlement, upon exposure to above ambient temperatures has been a longstanding impediment of many common elastomers. The deteriorating effect of heat upon elastomers has prompted continuing efforts and the use of a variety of remedial measures to improve their resistance to heat, such as the development and use of antioxidants or agents which block the action of oxygen or free radical forming ingredients, and new compound formulations.

The characteristic loss of elasticity or embrittlement of elastomers is a particularly significant and critical problem in the electrical insulating field wherein conductors insulated with heat degradable elastomers are utilized in areas which are exposed to high temperatures, such as leads or wires in or about motors and transformers, or within apparatus containing heating elements or which are otherwise disposed in locations encountering high temperatures.

SUMMARY OF THE INVENTION

This invention comprises a novel rubber composition of a specific combination of compounded ingredients and proportions thereof which has significantly improved resistance to heat, or heat aging, along with satisfactory physical and electrical properties. The heat resistant rubber composition of this invention is composed of an essential combination of ethylene-propylene rubber, chlorosulfonated polyethylene, zinc oxide, talc and carbon black in particular proportions, and can include optional components which enhance the overall attributes of the rubber composition. The invention additionally includes electrical conductors insulated with the highly heat resistant ethylene-propylene rubber compound.

OBJECTS OF THE INVENTION

It is a primary object of this invention to provide a novel rubber composition having increased resistance to high temperatures.

It is a further object of this invention to provide a novel curable rubber composition and products thereof which withstand high temperatures and exhibit stable chemical, physical and electrical properties over extended periods of exposure to elevated temperatures.

It is an additional object of this invention to provide a crosslink cured ethylene-propylene rubber composition that is resistant to embrittlement and loss of elasticity upon prolonged heating and possesses physical and electrical attributes which render it advantageously suitable for use as an electrical insulating material for conductors such as wire and cable.

It is also a primary object of this invention to provide a new and improved heat resistant electrical conductor product insulated with a cured elastomer composition having a high tolerance to elevated temperature and apt physical and electrical properties whereby the insulating material substantially maintains its original elastic, flexible and dielectric characteristics through its service life regardless of temperature conditions.

It is a specific object of this invention to provide an ethylenepropylene rubber composition possessing apt electrical properties, abrasion and tear resistance, flexibility and elasticity, and which retains these attributes notwithstanding high temperature conditions, and an improved heat stable electrical insulation thereof.

BRIEF DESCRIPTION OF THE DRAWING

The drawing comprises a perspective view of a section of an electrical conductor insulated with the novel and improved rubber composition of this invention.

DETAILED DESCRIPTION OF A PREFERRED EMBODIMENT

This invention specifically consists of a novel combination of compounded ingredients and relative proportions thereof which in total produce an elastomeric composition having outstanding stability and resistance to deterioration upon subjection to elevated temperatures over extended periods.

The rubber composition of this invention comprises the combination, in approximate parts by weight, consisting essentially of:

| | | |
|---|---|---|
| Ethylene-propylene rubber | 100 | |
| Chlorosulfonated polyethylene | 3 – | 10 |
| Zinc Oxide | 15 – | 30 |
| Talc | 75 – | 200 |
| Vinyl silane | 1 – | 3 |
| Carbon black | 10 – | 30 |
| Antimony oxide | 0 – | 10 |
| Antioxidant | 0.5 – | 6 |
| Peroxide curing agent | 2 – | 8 |
| Curing Coagent | 0 – | 3 |

The ethylene-propylene rubber component comprises ethylene-propylene copolymers and terpolymers of typical commercially available compositions constituting about 25 to about 75 parts by weight of ethylene monomer copolymerized with about 75 to about 25 parts by weight of propylene monomer. Terpolymers of ethylene-propylene include those commercial rubbers produced by the copolymerization of ethylene and propylene together with minor proportions of dienes such as ethylidene norbornene, dicyclopentadiene and 1,4-hexadiene.

Talc, of course, consists of a well known but distinctive mineral form of hydrated magnesium silicate. It is preferred that the talc component of this invention be of the plate type in its physical form.

Antioxidants for use in the composition of this invention should be of the amine, hydroquinoline, or other heterocyclic types. Amine type antioxidants include, for example, di-B-naphthyl-p-phenylenediamine, and hydroquinoline type comprise the polymerized 1,2-dihydro-2,2,4-trimethylquinolines. Other types of heterocyclic antioxidants include, for example, zinc salt of 2-mercaptobenzimidazole.

Peroxide crosslink curing agents for the ethylene-propylene rubber compound of this invention comprises the free radical forming organic peroxides such as tertiary peroxides characterized by at least one unit of the structure

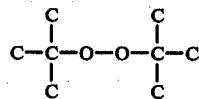

which is activated by its decomposition at temperatures in excess of about 295° F. The use of such peroxides in crosslinking polymers is described in detail in U.S. Pat.

Nos. 2,888,424; 3,079,370; and 3,214,422. A commonly used and preferred curing agent for this invention is dicumyl peroxide. Other useful peroxide curing agents include the tertiary diperoxides such as 2,5-dimethyl-2,5(t-butyl peroxy)hexane, and 2,5-dimethyl-2,5di(t-butyl peroxy)hexyne-3, and the like diperoxy compounds.

The use of a peroxide curing coagent in the crosslinking of the novel composition of this invention is strongly preferred to increase the efficiency of the cure in accordance with the technology in this art. Apt curing coagents include, for example, trimethylol propane trimethacrylate and other esters of methacrylic acid such as ethylene glycol dimethacrylate and 1,3butyl glycol dimethacrylate. Additional examples of coagents are set forth in an article entitled "Evaluation Of Cross-Linking Coagents In Ethylene-Propylene Rubber" by Lenas, *I&EC Product Research & Development*, Volume 2, No. 3, September, 1963, pages 202 – 208.

A processing aid is generally desirably included in the rubber composition of this invention to facilitate the compositions preparation and handling such as the mixing or compounding of its ingredients and/or its forming and consolidation into a product shape by molding or extrusion. Processing aids include oils, waxes and jellies derived from petroleum or hydrocarbon sources and they serve to unite the ingredients into a coherent and uniform workable plastic mass and/or to provide a lubricant therein.

The following comprise examples illustrating specific embodiments of this invention and demonstrating their improved resistance to heat in relation to a control comprising a prior art heat resistant composition.

The compounds of the control and each example of this invention were all prepared in an identical manner, comprising first admixing all components, except the peroxide curing agent and curing coagent, in a Banbury for about 12 minutes while heating to about 250° F. After cooling to room temperature, the curing coagent was added to the admixture on a two roll rubber mill followed by the addition of the peroxide and dispersed through the other ingredients.

The compositions of the control and the examples of this invention were as follows in approximate parts by weight:

|  | CONTROL | | | EXAMPLES | | |
|---|---|---|---|---|---|---|
|  | A | B | C | I | II | III |
| Ethylene-propylene-diene terpolymer (du Pont-Nordel 1145) | 100 | 100 | 100 | 100 | 100 | 100 |
| Chlorosulfonated polyethylene (du Pont-Hypalon 40) | — | — | — | 5 | 5 | 5 |
| Zinc Oxide | 5 | 5 | 20 | 20 | 20 | 20 |
| Talc - hydrated magnesium silicate (Sierra Talc - Mistron Vapor) | 179 | 179 | 179 | 179 | 179 | 179 |
| Vinyl Silane | 3 | 3 | 3 | 3 | 3 | 3 |
| Carbon Black | 20 | 20 | 20 | 20 | 20 | 20 |
| Antimony Trioxide | — | — | — | — | 5 | 5 |
| Antioxidants - Reaction product of acetone and diphenylamine (Uniroyal - B.L.E.-25) | 2 | — | — | — | — | — |
| Zinc Salt of 2-mercaptobenzimidazole (Mobay Chemical-Z.M.B.) | — | 2 | 2 | 2 | 2 | 2 |
| Polymerized 1,2-dihydro-2,2,4-trimethylquinoline (R.T. Vanderbilt - Agerite MA) | — | 2 | 2 | 2 | 2 | 2 |
| Diisodecyl phthalate | — | — | — | — | — | 0.5 |
| Processing lubricant oil (Sun Oil - Sunpar 2280) | 54 | 54 | 54 | 54 | 54 | 54 |
| Dicumyl peroxide curing agent (Hercules - Di Cup R) | 4.19 | 4.19 | 4.19 | 4.19 | 4.19 | 4.19 |
| Curing Coagent - trimethyl propane trimethacrylate (Sartomer Resin - SR-350) | 2 | 2 | 2 | 2 | 2 | 2 |

Samples of each composition of the controls and of the examples of this invention were prepared and crosslink cured by molding identical quantities for 3 minutes at 200° F–220° F in a press and then curing in an open steam vulcanizer for 1 minute at 250 pounds per square inch gauge steam pressure.

The tensile strength and percent elongation were determined for the original crosslink cured composition of each control and example and for each of said compositions after an accelerated heat aging for 13 days at a temperature of 175° C. The measured properties were as follow:

|  | CONTROLS | | | EXAMPLES | | |
|---|---|---|---|---|---|---|
|  | A | B | C | I | II | III |
| Original Properties |  |  |  |  |  |  |
| Tensile Strength, lbs/in² | 1002 | 1111 | 1005 | 1009 | 1001 | 1011 |
| Elongation, percent | 262 | 213 | 227 | 271 | 233 | 280 |
| 13 Days In Air Oven At 175° C |  |  |  |  |  |  |
| Tensile strength, lbs/in² | Brittle | Brittle | 371 | 756 | 121 | 786 |
| Percent retention | Brittle | Brittle | 36.9 | 74.9 | 112 | 77.7 |
| Elongation, percent | Brittle | Brittle | 22 | 57 | 58 | 58 |
| Percent retention | Brittle | Brittle | 9.7 | 21 | 26 | 20.7 |

Additional samples of unaged compositions of Control A and Examples II and III were subjected to long term aging tests under the following conditions and their resultant tensile strength and elongation properties were determined as follows:

|  | CONTROL A | EXAMPLES | |
|---|---|---|---|
|  |  | II | III |
| Long Term Aging |  |  |  |
| 30 Days In Air Oven at 136° C |  |  |  |
| Tensile, lbs/in² | 1112 | 1141 | 1202 |
| Percent retention | 111 | 114 | 119 |
| Elongation, percent | 193 | 223 | 217 |
| Percent retention | 74 | 95.8 | 77.5 |
| 60 Days In Air Oven at 136° C |  |  |  |
| Tensile, lbs/in² | 1048 | 1166 | 1228 |
| Percent retention | 104.6 | 116.5 | 121.5 |
| Elongation, percent | 133 | 212 | 205 |
| Percent retention | 50.8 | 91.1 | 73.2 |
| 90 Days In Air Oven at 136° C |  |  |  |
| Tensile, lbs/in² | 953 | 1119 | 1201 |
| Percent retention | 95.1 | 111.8 | 118.8 |
| Elongation, percent | 102 | 177 | 187 |

-continued

|  | CONTROL A | EXAMPLES | |
|---|---|---|---|
|  |  | II | III |
| Percent retention | 38.9 | 76 | 66.8 |

Referring to the drawing, there is shown a typical construction for an insulated electrical wire or cable product 10, comprising a metallic conductive element 12 and an overlying body of cured elastomeric insulation 14 extending thereabout or covering the conductor. In the drawing, the product 10 is illustrated as a short section with the insulation 14 removed from the end portion of the conductor 12. According to one embodiment of this invention, the novel heat resistant ethylene-propylene rubber composition thereof can be used to provide or form the insulation 14 on a conductor 12 of wire or cable product 10. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of this invention.

What we claim and desire to secure by Letters Patent of the United States is:

1. A curable ethylene-propylene rubber composition having improved resistance to heat and apt electrical and physical properties, consisting essentially of the combination in approximate parts by weight of:

| Ethylene-Propylene Rubber | 100 | |
|---|---|---|
| Chlorosulfonated Polyethylene | 3– | 10 |
| Zinc Oxide | 15– | 30 |
| Talc | 75– | 200 |
| Vinyl Silane | 1– | 3 |
| Carbon Black | 10– | 30 |
| Antimony Oxide | 0– | 6 |
| Antioxidant | 0.5– | 6 |
| Peroxide Curing Agent | 2– | 8 |
| Curing Coagent | 0– | 3. |

2. The crosslink cured product of the ethylene-propylene rubber composition of claim 1.

3. A curable ethylene-propylene rubber composition having improved resistance to heat and apt electrical and physical properties, consisting essentially of the combination in approximate parts by weight of:

| Ethylene-Propylene Rubber | 100 |
|---|---|
| Chlorosulfonated Polyethylene | 5 |
| Zinc Oxide | 20 |
| Talc | 179 |
| Vinyl Silane | 3 |
| Carbon Black | 20 |
| Antimony Trioxide | 5 |
| Antioxidant | 4 |
| Processing Lubricant Oil | 54 |
| Peroxide Curing Agent | 4.19 |
| Curing Coagent | 2. |

4. The crosslink cured product of the ethylene-propylene rubber composition of claim 3.

5. A curable ethylene-propylene rubber composition having improved resistance to heat and apt electrical and physical properties, consisting essentially of the combination in approximate parts by weight of:

| Ethylene-Propylene-Diene Terpolymer | 100 |
|---|---|
| Chlorosulfonated Polyethylene | 5 |
| Zinc Oxide | 20 |
| Talc | 179 |
| Vinyl Silane | 3 |
| Carbon Black | 20 |
| Antimony Trioxide | 5 |
| Zinc Salt of 2-mercaptobenzimidazole | 2 |
| Polymerized 1,2-dihydro-2,2,4,-trimethylquinoline | 2 |
| Diisodecyl Phthalate | 0.5 |
| Process Lubricant Oil | 54 |
| Dicumyl Peroxide | 4.19 |
| Trimethylol Propane Trimethacrylate | 2 |

6. The crosslink cured product of the ethylene-propylene rubber composition of claim 5.

7. A curable ethylene-propylene rubber composition having improved resistance to heat and apt electrical and physical properties, consisting essentially of the combination in approximate parts by weight of:

| Ethylene-Propylene-Diene Terpolymer | 100 | |
|---|---|---|
| Chlorosulfonated Polyethylene | 3 – | 10 |
| Zinc Oxide | 15 – | 30 |
| Talc | 75 – | 200 |
| Vinyl Silane | 1 – | 3 |
| Carbon Black | 10 – | 30 |
| Antimony Trioxide | 0 – | 10 |
| Zinc Salt of 2-mercaptobenzimidazole | 0.25 – | 3 |
| Polymerized 1,2-dihydro-2,2,4-trimethylquinoline | 0.25 – | 3 |
| Diisodecyl Phthalate | 0 – | 2 |
| Processing Lubricant Oil | 0 – | 100 |
| Dicumyl Peroxide | 2 – | 8 |
| Trimethylol Propane Trimethacrylate | 0 – | 3 |

8. The crosslink cured product of the ethylene-propylene rubber composition of claim 7.

* * * * *

UNITED STATES PATENT AND TRADEMARK OFFICE
CERTIFICATE OF CORRECTION

PATENT NO. : 4,069,190
DATED : January 17, 1978
INVENTOR(S) : Joseph Edward Vostovich It is certified that error appears in the above-identified patent and that said Letters Patent are hereby corrected as shown below:

Claim 1, in the table that portion reading

"Antimony Oxide         0-    6"  should read

--Antimony Oxide        0-   10--.

Signed and Sealed this

Fourth Day of March 1980

[SEAL]

Attest:

SIDNEY A. DIAMOND

Attesting Officer

Commissioner of Patents and Trademarks